United States Patent [19]

Vinson

[11] 3,787,821

[45] Jan. 22, 1974

[54] READ ONLY MEMORY

[75] Inventor: Billy H. Vinson, San Diego, Calif.

[73] Assignee: Digital Scientific Corporation

[22] Filed: June 21, 1971

[21] Appl. No.: 155,201

[52] U.S. Cl. ...................... 340/173 SP, 340/174 DA

[51] Int. Cl. ............................................ G11c 17/00

[58] Field of Search ................. 340/174 DA, 173 SP

[56] References Cited

UNITED STATES PATENTS

| | | | |
|---|---|---|---|
| 3,130,388 | 4/1964 | Renard | 340/173 SP |
| 3,245,054 | 4/1966 | Byron | 340/173 SP |
| 3,287,706 | 11/1966 | Rogers | 340/173 SP |
| 3,231,875 | 1/1966 | Ishidate | 340/174 R |
| 3,381,279 | 4/1968 | Bergh et al. | 340/173 SP |
| 3,290,660 | 12/1966 | Petschauer | 340/173 SP |

FOREIGN PATENTS OR APPLICATIONS

| | | | |
|---|---|---|---|
| 1,375,807 | 9/1964 | France | 340/173 SP |

OTHER PUBLICATIONS

Bruce, G. D. et al., Address Control of Bit Drivers. IBM Technical Disclosure Bulletin; Vol. 5, No. 3; Aug. 1962, pgs. 26–27.

*Primary Examiner*—Terrell W. Fears
*Attorney, Agent, or Firm*—Leonard Golove et al.

[57] ABSTRACT

A high speed semipermanent read only memory is described in which energy is coupled from a first drive line to an orthogonally positioned sense line. In the preferred embodiment, the drive lines are jogged at right angles and the sense lines are caused to cross at right angles to the drive lines and preferrably directly over the right angle jog. The jog is positioned so as to increase the distance between the parallel drive lines in the area of the crossing between the drive and the sense lines. The action of the jog has the effect of inducing a small voltage in the sense line and having a polarity that is opposite to the polarity of the output voltage in the sense line when a conductive patch is present. In those areas of crossing between the drive lines and the sense lines where a desired output is required, a small conductive nonmagnetic material is placed over the area of crossing. A current in the drive lines will induce an eddy current in the conductive patch which in turn induces a voltage in the associated sense line which has an opposite polarity to that caused by the jog and which will be called positive.

In the presence of a desired signal such as a "1", a strong positive signal is detected in the sense line and where a "0" output is desired, such as by having no conductive path over the crossing, a small negative signal will be detected thereby allowing a differential amplifier in the sense line to discriminate between "0" and "1" in a manner not heretofore possible.

19 Claims, 11 Drawing Figures

Fig. 2.
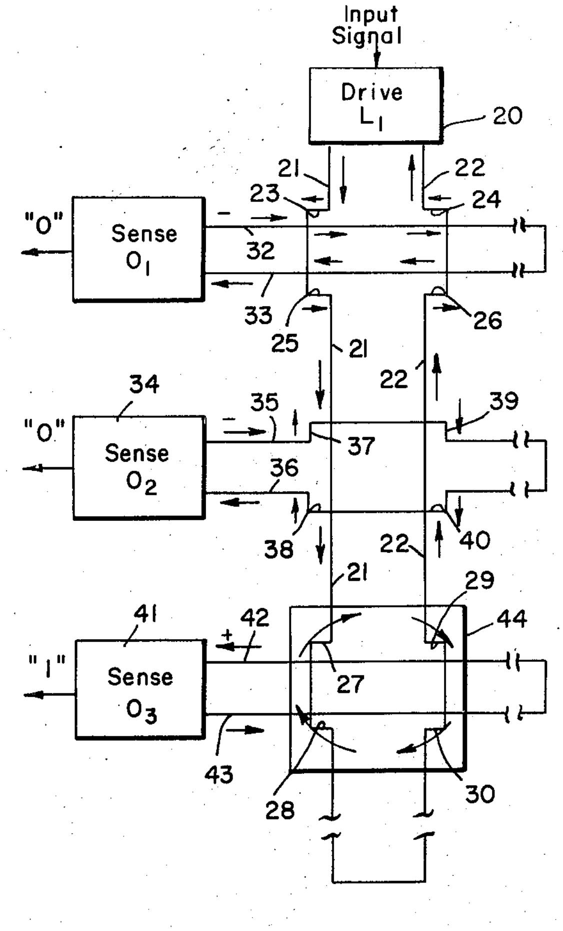
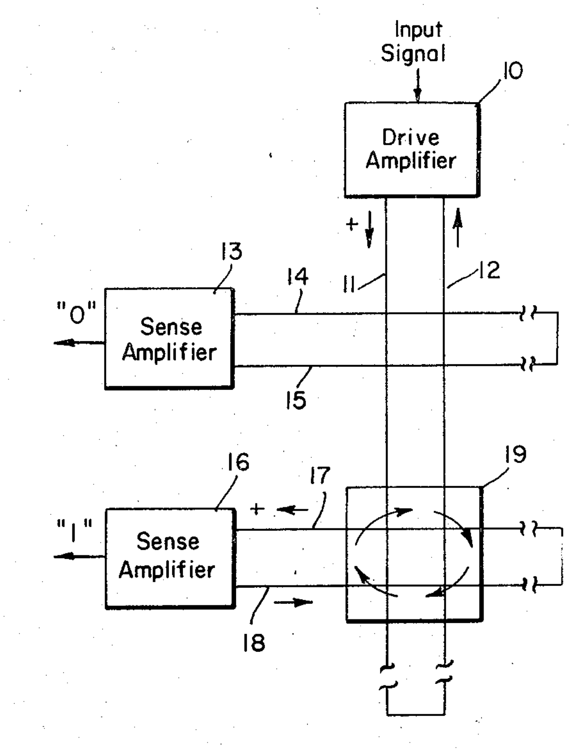
Fig. 1.
(PRIOR ART)
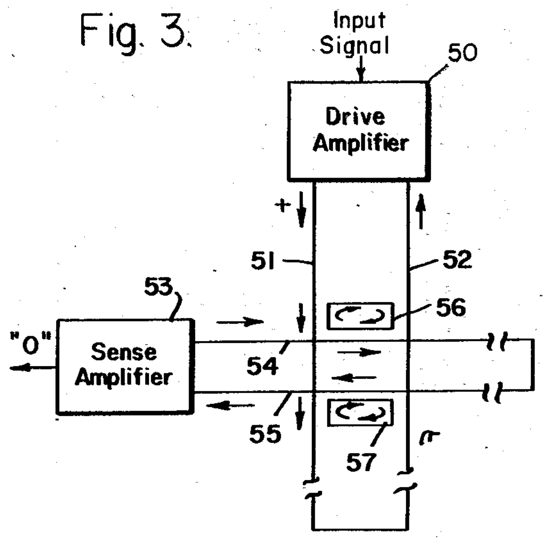
Billy H. Vinson,
INVENTOR.
BY.
GOLOVE,
KLEINBERG &
MORGANSTERN,
ATTORNEYS.

Billy H. Vinson,
INVENTOR.
BY.
GOLOVE,
KLEINBERG &
MORGANSTERN,
ATTORNEYS.

Billy H. Vinson,
INVENTOR.
BY.
GOLOVE,
KLEINBERG &
MORGANSTERN,
ATTORNEYS.

Billy H. Vinson,
INVENTOR.
BY.
GOLOVE,
KLEINBERG &
MORGANSTERN,
ATTORNEYS.

READ ONLY MEMORY

This invention relates to a signal producing device and more particularly to a semi-permanent programmable signal producing device of the type generally referred to as a read only memory (ROM).

In high speed computing and data processing equipment, apparatus is necessary to provide fixed control signals for directing the internal operations of the equipment. Such control generating equipment may be wired in or otherwise incorporated into the basic control circuitry. Various authors have therefore coined the phrase "read only memory" to describe a device that on command applied predetermined control signals according to a prewired organization that can be incorporated when the device is built. Such devices have been termed "firmware" in an article in Datamation Magazine, for January 1967, at page 22, entitled "Fourth Generation Softward, The Realignment" by Ascher Opler. Alternative programs can be prewired and supplied as supplemental components. An early example of such a read only memory is a plug board and pin board which control the operation of the earliest commercial computers. Today the term "read only memory" has been generally accepted.

Early read only memories were constructed utilizing magnetic core matrices in which cores at predetermined cross points were removed to eliminate inductive coupling at such cross points. However, such memories were generally permanent in that a magnetic core once broken could not be replaced without rebuilding the entire matrix. The core is subject to physical limitations in that the frequency of operation is limited by the ability of the individual cores to switch. Magnetic cores generally can not switch in less than 100 nano seconds, representing a frequency limit of approximately 10 mHz.

Other prior art devices utilize E-shaped magnetic devices which are appropriately wound to provide control signals for a computer and have been described in an article by S. J. Bailey, entitled "Faster Computer Control With a Read Only Memory", at page 65, in the August 1967 issue of Control Engineering Magazine. Such magnetic devices, however, are frequency limited because of the large inductive load which must be driven and by the cross talk that increases with higher frequency operation thereby reducing the signal to noise ratio to unacceptable levels.

One specific approach to the problem is set forth in U. S. Pat. No. 3,231,875, patented Jan. 25, 1966, by Takashi Ishidate and entitled Converter For Converting a Semipermanent Memory Into an Electrical Signal. Ishidate describes a semipermanent memory comprised of drive windings and sense windings which are orthogonally positioned relative to one another. He recognizes that a driving signal on the drive windings will produce no output in the sense windings since there is no inductive coupling between the drive and sense windings. He discloses, however, that by proper positioning of sheet like conductive means in close proximity to both drive and sense windings, that eddy currents will be induced in the conductive means which in turn will induce a current into the associated sense windings generally recognized as a binary 1 condition, whereas the absence of such eddy current producing means will prevent any inductive coupling from existing which, in turn, will be recognized as a binary 0 condition. He suggests the use of cards having conductive coatings at selective positions upon the cards. However, he recognizes that such cards have been found to be rather tedious and expensive. The present invention is concerned with using the same eddy current principles disclosed by Ishidate. However, there is disclosed a totally different approach which provides an improved signal to noise ratio between ones and zeroes by always coupling energy from the drive line regardless of whether a conductive patch is placed over the crossing of the drive windings or sense windings. By always providing a small negative output signal in the presence of a driving signal, it is now possible to sense the difference between a binary 1 and a binary 0 condition by means of the polarity of the detected sense voltage and the magnitude of the voltage. In addition, there is disclosed an improved memory board which provides a more efficient transfer of energy but now makes the read only memory utilizing eddy current conductive coupling techniques a practical reality.

In the preferred embodiment, the read only memory consists of a plurality of drive lines etched on a circuit memory board in which each pair of lines are looped at one end and connected at the other end to the drive amplifier. The circuit board is substantially thick and becomes the main circuit board for supporting the complete memory. The sense lines similarly are etched on a relatively thin, flexible, insulative sheet preferably constructed of Kapton insulation upon which the sense lines are etched. Each pair of sense lines are at one end connected together. The other ends of the sense lines will eventually be looped together and pass through a ferrite bead in a manner to be described. The flexible Kapton is bonded to the one side of the circuit board in such a manner that the Kapton material is placed over the drive lines thereby insulating the sense lines from the drive lines. In addition, the rotation of the Kapton is such that the sense lines are orthogonally placed relative to the drive lines on the circuit board. A single ferrite bead for each sense position is embedded into the circuit board and the open end of the sense line is threaded through the associated bead and connected to the other sense line to thereby form a complete sense loop. In the preferred embodiment, there are 32 pairs of drive lines and similarly, there are 32 sense loops thereby making a total of 32 times 32 or 1,024 individual crossings between pairs of drive lines and sense loops. In the preferred embodiment, each sense loop is a complete and separate loop which has the effect of forming a seaparate primary winding passing through its own ferrite core. The output coupling from each of the sense lines consists of 32 differential amplifiers each coupled by means of a separate secondary loop passing through each bead associated with a separate sense winding. The function of the secondary windings will be described in connection with a plurality of stacked circuit boards since the secondary winding will pass through all beads in associated sense loop positions.

In accordance with the teachings of the present invention, the pair of drive windings in the area of the crossing contains a right angle jog in both drive lines that increases the distance between the pair of drive lines in the area of the crossing. In the embodiment actually constructed, the distance of each jog amounted to no more than 0.005 inch and the location of the sense wires is preferably directly over the jog to thereby increase the coupling between the drive windings and the sense windings. The effect of the jog is to always induce a voltage in the sense windings in a direction that is opposite to the voltage contained in the drive windings. This has the unobvious advantage of generating a negative signal whenever a zero bit condition is evidenced by having no external coupling between the drive windings and the sense windings. It is recognized however that while the preferred embodiment places the jog in the drive windings that the benefits of this invention may also be achieved by placing the jog in the sense windings and by similarly placing the drive windings directly over the jog in the sense windings. The choice of placing the jog in the drive windings was one of design considerations only.

Coupling between the drive windings and the sense windings is achieved by means of a conducting non-magnetic patch placed over the area of the crossing. In the preferred embodiment, a thin layer of mylar insulative material is placed over the sense windings to insulate and physically protect the sense windings. A separate information board also containing 1,024 individual areas representing the total number of crossings possible in the board just described is adapted to contain the non-magnetic conductive patches which may be placed in any one of the 1,024 positions. Patches are preferably attached to the substrate board by means of an adhesive backing. In actual use, the information board is arranged to be located against the memory board in such a manner that the adhesive patches are located directly against the mylar thereby providing the maximum amount of coupling between the drive lines and the associated sense lines.

Further objects and advantages will be made more apparent as the description progresses, reference now being made to the accompanying drawings wherein:

FIG. 1 is a schematic diagram of the prior art systems for selectively coupling energy between orthogonally located sense and drive lines;

FIG. 2 is a schematic diagram illustrating a preferred embodiment for coupling energy between orthogonally located sense and drive lines constructed according to the principles of the present invention;

FIG. 3 is a second embodiment for coupling energy between orthogonally located sense and drive lines;

Figure 10:
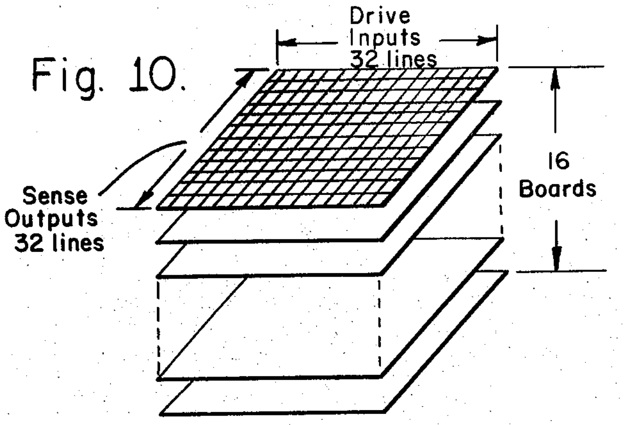
Figure 11:
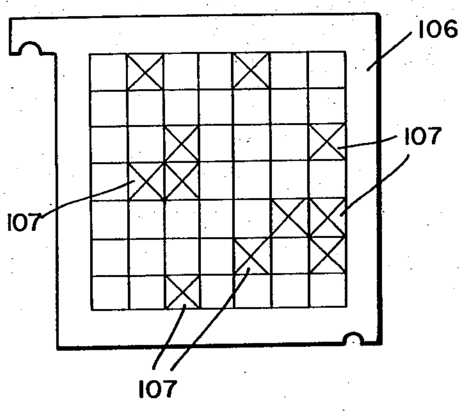

FIG. 10 is a pictorial representation of a preferred read only memory comprising 16 boards each having 32 drive positions and 32 sense positions; and FIG. 11 illustrates the information board containing the electrically conductive non-magnetic patches each covering a selected area with a pair of drive lines and sense lines cross.

This invention represents an improvement in the high speed semipermanent read only memory systems which use eddy current conductors that are placed according to the information to be stored. The basic idea is generally attributed to Takashi Ishidate as mentioned previously in which he teaches the use of a thin film electrically conductive and non-magnetic material which forms a closed loop in a manner that is similar to that of the Unifluxor. By placing the conductive patch in cloce proximity to the drive wires and the sense wires, it is now possible to obtain a coupling through the circulating eddy currents set up in the conductive patch and hence, the sense windings will generate an output signal in the presence of a signal on the associated drive windings.

Referring now to FIG. 1, there is shown a system constructed according to the teachings of the prior art which comprises a drive amplifier 10 connected to a pair of parallel drive lines 11 and 12. Drive lines 11 and 12 are parallel and are looped at one end to form a continuous loop back to the drive amplifier 10. An output, if any, is obtained from a sense amplifier 13 which is connected to a pair of parallel sense lines 14 and 15 which are connected at one end and return to the sense amplifier 13. The sense lines 14 and 15 cross the drive lines 11 and 12 orthogonally and as a result, there is no coupling between the drive lines and the sense lines. In actual practice, there are a plurality of sense amplifiers such as sense amplifier 16 which is connected to a pair of parallel sense lines 17 and 18 that are similarly looped at one end and return to the sense amplifier. A non-magnetic electrically conductive thin conducting film 19 is located over the area of the crossing between the drive lines 11 and 12 and the sense lines 17 and 18. In the presence of an input signal fed to the drive amplifier 10, there will be no coupling between sense lines 14 and 15 and hence, no signal will be detected by the sense amplifier 13. The signal on drive line 11 will, however, induce a voltage in the thin conductive film 19 that is equal and opposite to the original current on drive line 11. This induced voltage will in turn generate the circulating current within the conductive film. The circulating current will in turn induce a voltage in sense line 17 and sense line 18 and in a direction that is opposite to the circulating current in the conductive film. The induced signal on line 17 is in the same direction as the drive signal on line 11. The induced signal on lines 17 and 18 is detected by the sense amplifier 16. At a given period of time, the sense amplifier 13 and the sense amplifier 16 are interrogated and the absence of a signal in the sense amplifier 13 is detected as a binary 0 bit of information and the presence of a signal in the sense amplifier 16 is detected as a binary 1 bit of information.

The prior art system just described has not achieved the commercial success it deserves because of problems with noisy signals and the problems associated with detecting the presence of a desired signal over background noise. To date, all attempts to solve the problem of signal to noise have involved brute force techniques which have not solved the basic problem of improving the signal to noise ratio.

Referring now to FIG. 2, there is shown a first embodiment of the present invention which achieves an improved signal to noise ratio between binary 1 bits of information and binary 1 bits of information. This improved signal to noise ratio is achieved by arranging the sense and drive lines in such a manner that in the absence of a conductive film, a small negative signal will always be induced in the associated sense line. It then becomes possible to detect the presence of a 0 bit of information by now detecting a negative signal in the sense line whereas as before, a binary 1 bit of information is detected by the presence of a strong positive signal. The improved signal to noise ratio between the strong positive 1 bit of information signal and the negative signal representing a 0 bit of information improves the signal to noise ratio and allows more positive detecting means in discriminating between the binary 1 bit of information and the binary 0 bit of information.

Referring now to FIG. 2, there is shown a first embodiment illustrating how a right angle jog located either in the drive windings or in the sense windings will achieve the negative output in the presence of a drive signal without a conductive shield. In FIG. 2, there is shown a drive amplifier 20 connected to a pair of drive lines 21 and 22. Drive lines 21 and 22 are parallel except in the area of the first crossing where a right angle jog 23 and 24 is located in the lines, respectively, and in a direction so as to increase the distance between the drive lines. Drive lines 21 and 22 remain parallel in the area of the crossing and contain another right angle jog. 25 and 26 which return the distance between the drive lines to the same original parallel configuration. In the preferred embodiment, the drive lines will contain a similar jog at every sense line crossing. However, for explanatory purposes only, FIG. 2 illustrates a situation where the same effect can be achieved by having the sense lines contain the jog. Hence, for illustration purposes only, drive lines 21 and 22 are shown in a parallel configuration without a jog and still in another crossing situation they contain a jog as at 27 and 28 on line 21 and a jog at 29 and 30 on line 22. Lines 21 and 22 continue to the end of the board where they loop around and return back to the drive amplifier 20.

A sense amplifier 31 is connected to a pair of parallel sense lines 32 and 33 which in the preferred embodiment sense line 32 is arranged to pass over the jog 23 and 24 whereas sense line 33 is arranged to pass directly over the jog 25 and 26. However, for illustration and explanatory purposes, the sense lines 32 and 33 are shown to cross at a different location.

Figure 5:
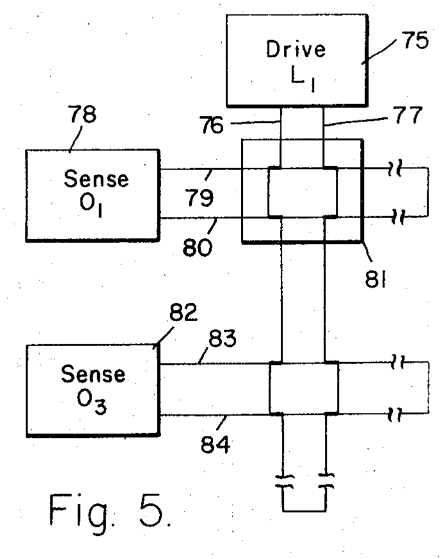
FIG. 5 is a schematic diagram illustrating the preferred placement of the sense lines relative to the drive lines in the crossing relationship.

FIG. 5 illustrates the preferred relationship between the sense lines and the drive lines. The individual sense lines 32 and 33 continue to the end of the board, loop around and return to the sense amplifier 31.

Another species of the same embodiment is shown in connection with a sense amplifier 34 which is connected to a pair of parallel sense lines 35 and 36. The sense lines 35 and 36 contain a right angle jog and, as at 37 and 38, in such direction as to increase the distance between the sense lines 35 and 36. A second jog as at 39 and 40 returns the sense lines 35, 36 to their original parallel positions from which they continue from the end of the board, loop around the return to the sense driving amplifier 34. To complete the illustration, a third sense amplifier 41 is shown connected to a pair of parallel sense lines 42 and 43 which pass across the drive lines 21 and 22 within the area of the jog defined by jogs 27, 28, 29 and 30 after which they pass to the end of the board, loop around and return to the sense amplifier 41.

In the presence of an input signal fed to the drive amplifier 20, a driving signal will appear on drive lines 21 and 22, as shown. In view of the jogs 23 and 25, the current appearing on drive line 21 will induce a signal in sense lines 32 and 33 in a direction that is equal and opposite to the original direction of the driving signal. The action of the jogs 24 and 26 will have an enhancing effect due to the driving current appearing on drive line 22. The net effect therefore, is that a signal will be induced on lines 32 and 33 that is in a direction that is opposite to the direction of the original inducing signal for the convention selected.

In a similar manner, the driving current appearing on line 21 will induce an equal and opposite signal appearing on the jog at 37 and 38, which jogs are contained in the sense lines 35 and 36. In a similar manner, the drive current appearing on drive lines 22 will induce a signal that enhances the signal already induced on sense lines 35 and 36. It can be shown therefore, that placing the jog in the drive line or in the sense lines will have the same effect as long as the jog is in a direction that increases the spacing between the windings. For completeness, it will be noted that if the direction of the jog is opposite to that just defined, that the signal induced will be in the opposite direction and will defeat the benefits claimed by this invention.

A thin film, non-magnetic conductive patch 44 is located over the crossing between the drive lines 21 and 22 and the sense lines 42 and 43. A drive current appearing on drive lines 21 and 22 will therefore induce a circulating current in the conductive patch and in the same manner as previously described in connection with FIG. 1. This circulating current in the patch 44 will in turn induce a voltage in the sense lines 42 and 43 in a positive direction which for the convention chosen, will be in the same direction as the original drive current appearing on lines 21 and 22.

A look at the output of the sense amplifiers 31, 34 and 41 will show that sense amplifier 31 has detected a negative going signal which is easily identified and detected as a 0 bit of information. In a similar manner, the output of the sense amplifier 34 has detected a zero going signal which again is easily detected and identified as a 0 bit of information. The output of the sense amplifier 41, however, has detected a positive going signal which is identified as a 1 bit of information. The improvement in the signal to noise ratio in detecting the difference between a negative going signal and a positive going signal as opposed to the problem of detecting the difference between a zero signal and a positive signal represents a significant improvement in the signal to noise ratio. Referring now to FIG. 3, there is shown a second embodiment for achieving a negative output signal in the presence of a driving signal and in the absence of a thin film conductive patch. There is shown a drive amplifier 50 connected to a pair of parallel drive lines 51 and 52 which in turn run to the end of the board, loop around and the are connected back into the drive amplifier. A sense amplifier 53 is in turn connected to a pair of parallel sense lines 54 and 55 which are arranged to cross the drive lines 51 and 52 orthogonally and which then continue to the end of the board, loop around and return back into the sense amplifier 53. In order to achieve the negative output signal on sense lines 54 and 55 in the presence of a drive signal on drive lines 51 and 52, it was discovered that placing a non-magnetic electrically conductive patch in selective areas of the crossing that such a negative signal could be induced. In FIG. 3, for example, a pair of conductive patches 56 and 57 have been located external of the sense lines 54 and 55 but between the drive lines 51 and 52. In operation, a drive signal appearing on line 51 and 52 will induce a circulating eddy current in thin film patch 56 and 57 in a direction that is opposite to the driving voltage. The circulating current will in turn induce a signal in sense lines 54 and 55 that are in a direction opposite to the direction of the original driving signal. In other words, in the presence of a driving signal on line 51, a negative signal will appear on line 54 thereby achieving the same benefits as previously disclosed in connection with FIG. 2. It will be appreciated however that the conductive patches could equally have been located between the sense lines 54 and 55 external of the drive lines 51 and 52 and still obtain the benefits of the present invention. While the embodiment disclosed in connection with FIG. 3 does teach the same principles of the inventive concept previously disclosed, it is not easy to implement the embodiment of FIG. 3 due to the difficulty of accurately positioning the two conductive patches in each of the crossing areas between the drive lines and the sense lines. Economically, it is much simpler to construct the drive lines with the jogs as disclosed in connection with FIG. 2, since the jog can be constructed on the original substrate for all drive lines comprising the memory board and hence, a second operation of accurately locating a pair of conductive patches is eliminated.

Figure 4:
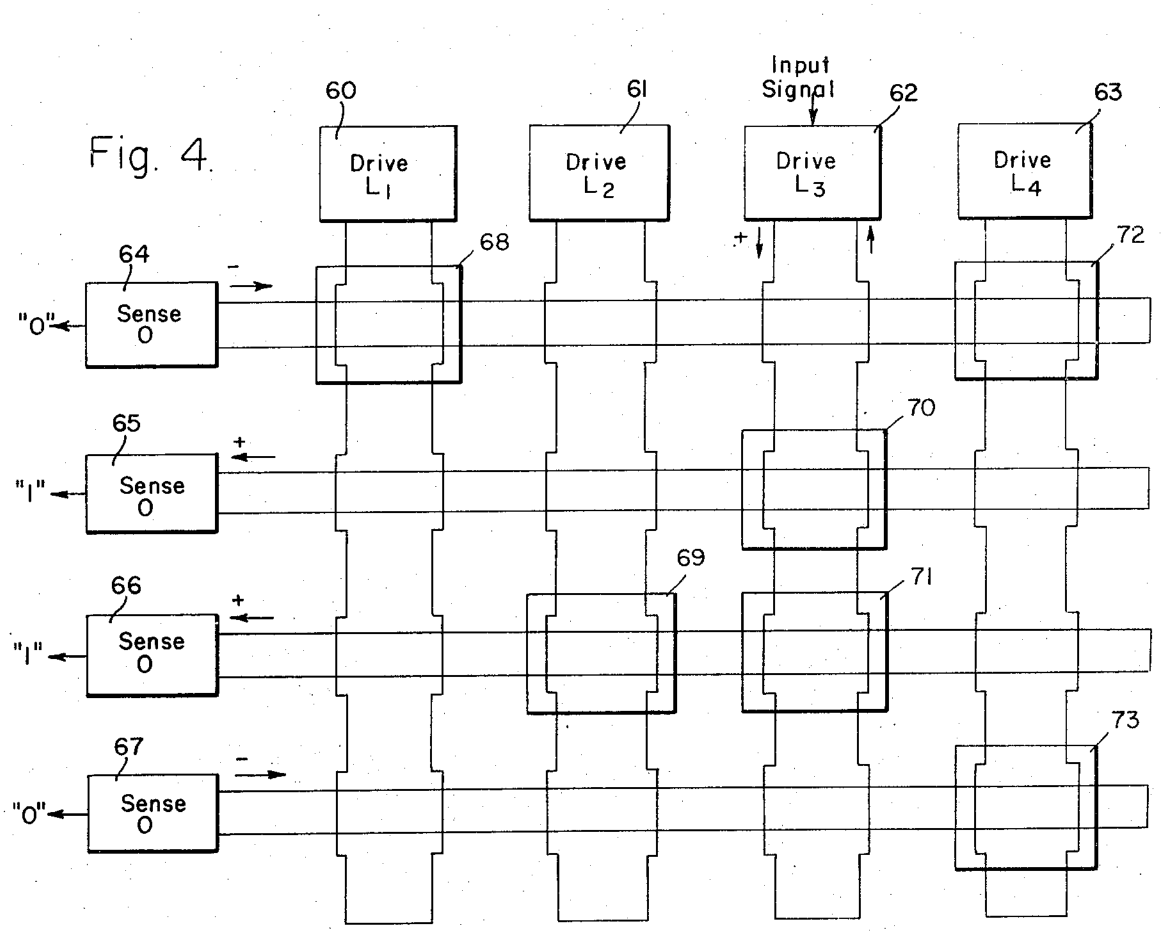
FIG. 4 is a block diagram illustrating a read only memory having four drive lines and four sense lines constructed according to the teachings of the present invention.

Referring to FIG. 4, there is shown a complete read only memory having four drive lines 60, 61, 62 and 63 and four sense lines 64, 65, 66 and 67. Each of the drive lines contains a jog which increases the distance between the associated drive wires in the area of the crossing between the drive lines and the sense lines. The sense lines associated with the sense amplifiers are all parallel and loop around and return to their associated sense amplifier. In accordance with the teachings of the invention, a non-magnetic conductive patch is located over the areas of those crossings where it is desired to have binary 1 output. In those areas that have no conductive patch, the output reading will be represented as a binary 0 output. In actual practice, the conductive patches 68, 69, 70, 71, 72 and 73 are actually located on a separate information board which is placed over and aligned with the memory board containing the drive lines and the sense lines. It is for this reason that the read only memory is called a semipermanent form of read only memory since the information board can be replaced with a different information board containing conductive patches at different locations and hence, the output of the sense amplifiers will be made to vary according to the locations of the patches on the information board. In operation, an input signal directed to the third line as at 62, will cause a drive signal to appear on the drive lines which will be detected as a negative signal on line 64, a positive signal on line 65, due to the action of conductive patch 70, a positive signal on sense line 66, due to the conductive patch 71, and a negative going signal on sense line 67. The output of the individual sense lines will therefore indicate a binary 0 for sense line 64, a binary 1 for sense line 65, a binary 1 for sense line 66 and a binary 0 for sense line 67.

Referring now to FIG. 5, there is shown a preferred embodiment illustrating the relationship between the jog on the drive lines and the position of the sense lines relative to the jog. A drive amplifier 75 is connected to a pair of drive lines 76, 77 each of which contain a jog and in the direction as previously described. A sense amplifier 78 is connected to a pair of sense lines 79 and 80 which are preferably caused to pass directly over the right angle jog appearing on the drive lines 76 and 77. In this manner, maximum couplingis achieved between sense line 79 and the two jogs and sense line 80 and the two jogs. A conductive patch 81 is shown for illustrative purposes to cover the area of the crossing between the drive lines 76, 77 and the sense lines 79 and 80. In a similar manner, sense amplifier 82 is connected to a pair of sense lines 83 and 84 which cross the jogs in drive lines 76 and 77 in the same manner as described in connection with sense lines 79 and 80. This preferred alignment of sense lines and drive lines relative to the jog in the drive lines is continued for all crossing positions. In the preferred embodiment, each memory board consisted of 32 pairs of drive lines and 32 pairs of sense lines with each pair of drive lines having jogs described and with each pair of sense lines passing directly over the jog in conformity with that preferred embodiment illustrated in FIG. 5.

Figure 6:
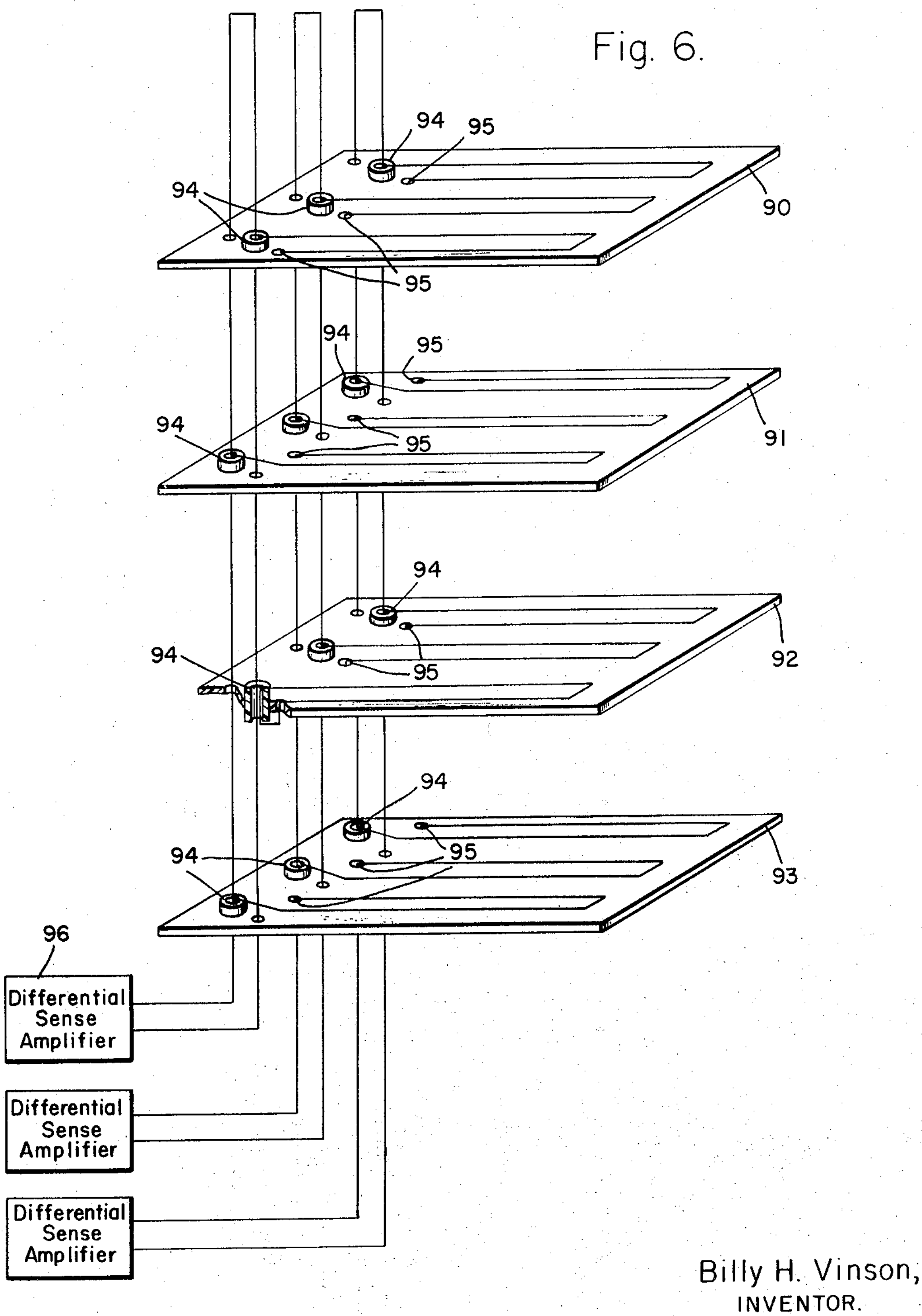
FIG. 6 illustrates the transformer coupling between the sense loops and the sense amplifier for a plurality of read only memory boards.

Referring now to FIG. 6, there is shown a plurality of memory boards 90, 91, 92 and 93 each having a plurality of parallel sense windings and a plurality of orthogonally related drive windings. In the preferred embodiment, there are 16 memory boards stacked in an array with each board containing 32 drive positions and 32 sense positions. For the configuration just described, a word is made to consist of 32 individual bits, which means, therefore, that each board contains 32 separate words. External logic techniques which do not form part of this invention are used to select the individual board having the word which is desired to be read out. This type of selection is sometimes called a linear select memory.

Read out of each sense line is actually achieved by means of a transformer coupled device. The output of each sense line is obtained by means of a plurality of ferrite beads 94 embedded in one end of the memory board 90. In the preferred embodiment, board 90 contains 32 sense loops and hence, there would be 32 ferrite beads 94 embedded in one end of board 90. The parallel pair of sense lines are arranged so that one line passes through the single aperture contained in bead 94 and passes through the bottom of the board through a small hole 95 through which the wire passes to be connected to the other sense line thereby creating a single continuous loop for each pair of sense windings. Since board 90 contains 32 pairs of sense windings, there would be 32 individual loops each passing through and coupled with its individual ferrite bead 94. A single differential sense amplifier 96 is arranged to couple with 16 ferrite beads located in the 16 memory boards. Each of the 32 sense loop positions will have a separate differential sense amplifier coupled with that loop position. With all 16 memory boards aligned and stacked in the preferred position, a single secondary wire is inserted through the associated 16 beads and returned to the input of the differential amplifier.

In order to achieve the maximum coupling between the single secondary and the 16 primaries, it was found most desirable to make the ferrite bead 94 as large as possible. Unfortunately, enlarging the ferrite bead, created a space problem between adjoining boards, thereby increasing the spacing and the bulk of the individual read only memory stack. It is considered very desirable in memory systems of this type to keep the distance between adjacent memory boards as small as possible and thereby increase the speed of interrogating and reading out of information from the read only memory. Unfortunately, the requirements of having a very tight package and mechanically large ferrite beads appeared at first to be inconsistent with each other.

Figure 7:
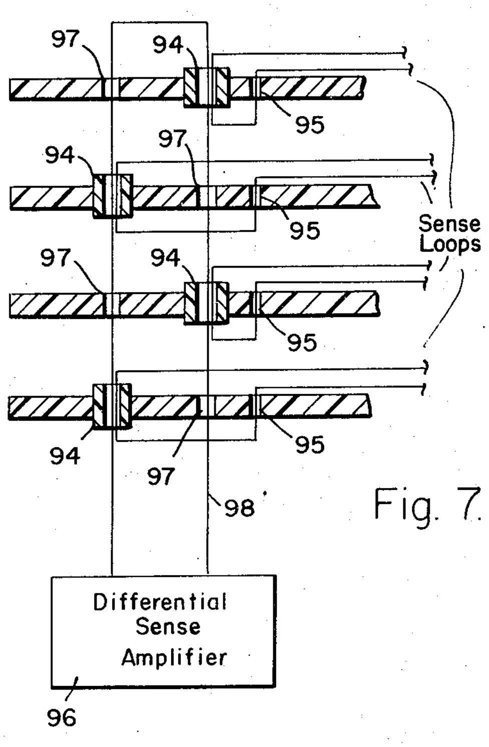
FIG. 7 is a cross-sectional view of the boards illustrated in FIG. 6 illustrating the single turn secondary loop for coupling energy from the sense loop windings in each board.

In the preferred embodiment where 16 individual memory boards are used, eight of the boards are constructed identically as shown as board 90 and 92 whereas alternate boards 91 and 93 are constructed so that the ferrite beads are offset in location from the ferrite beads located in boards 90 and 92. This offsetting of the ferrite beads in alternate memory boards is more fully illustrated in FIG. 7. With the memory boards aligned, as shown in FIG. 7, the ferrite beads 94 for boards 90 and 92 are in the same relative position. However, with respect to boards 91 and 93, the ferrite bead 94 is displaced as shown in boards 91 and 93. In order to allow a secondary wire to be threaded through the aligned ferrite beads, each of the alternate boards has a small hole 97 in a position corresponding to the ferrite bead 94 of the adjacent board. The differential amplifier 96 therefore has a single loop secondary wire 98 threaded through the hole 97 of board 93, the ferrite bead 94 of board 92, hole 97 of board 91, the ferrite bead 94 of board 92 and then loops around and returns through the hole 97 of board 90, the ferrite bead 94 of board 91, the hole 97 of board 92 and the ferrite bead 94 of board 93 back to the differential sense amplifier 96.

It can be seen therefore that FIGS. 6 and 7 actually illustrate 16 separate transformers, one in each of the 16 memory boards coupled together by means of a single common secondary loop feeding a single differential sense amplifier. In the preferred embodiment, which has 32 sense loop positions, there would be 32 differential sense amplifiers. The obvious advantage of this configuration is the fact that the large ferrite beads can now be used and still maintain the memory boards in a substantially tight mechanical package and thereby obtain the advantages of fast access time.

Figure 8:
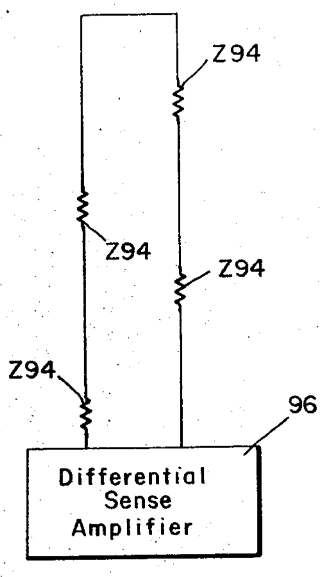
FIG. 8 is a schematic diagram illustrating the benefits of the system illustrated in FIG. 7.

An unobvious advantage obtained by means of the single loop secondary wire 98 feeding eight memory boards on one side of the loop and eight memory boards on the other side of the loop into the differential sense amplifier 96 is the cancellation of common mode noise signals which are created by having unbalanced impedances on the lines feeding the differential amplifier. As shown in FIG. 8, the individual impedances are now balanced on each line of the loop feeding the differential sense amplifier 96. Since the secondary wire 98 is looped around and returned, it can now be seen that the phase of the signals in each line of the loop feeding the differential sense amplifier have been reversed and the effect is a cancellation of the noise signals on one line against the noise signals on the other line since the impedances are substantially equal and the noise signals generated should be substantially equal and opposite and hence will cancel each other. While FIG. 8 illustrates only the cancelling of the two impedances on each leg of the secondary line in conformity with that illustrated in connection with FIG. 7, it will be readily apparent that in the desired preferred embodiment of 16 boards, that the same cancellation will take place with eight impedances on one line of the leg being equal and opposite to eight impedances on the second line of the leg feeding the associated differential sense amplifier.

Figure 9:
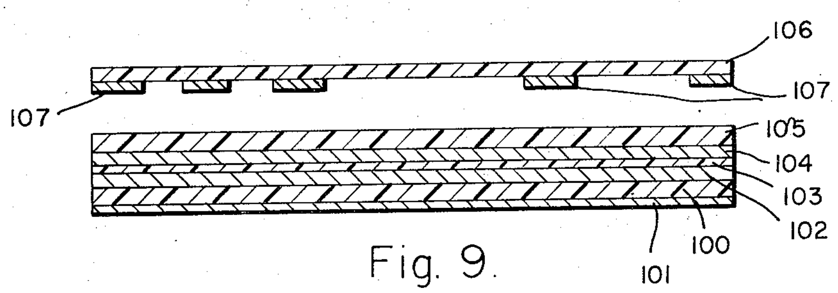
FIG. 9 is a cross-section of the printed circuit board and memory board comprising the read only memory.

Referring now to FIG. 9, there is shown a cross section of a single memory board and an information board comprising the read only memory. The memory board consists of a substrate 100 having a conductive shield 101 bonded to one side of the substrate. Since there are 16 memory boards in a packed configuration, the conductive shield 101 serves the purpose of preventing cross talk and cross modulation between signals. On the other side of the substrate 100 is a copper sheath 102 which is etched away according to the predetermined pattern to thereby establish the drive wires having the preferred right angle jogs as illustrated in connection with FIG. 4. A substantially flexible insulative substrate 103 preferrably made of an insulative material called Kapton contains a metal sheath 104 from which the sense wires are similarly etched away according to techniques that are considered well known in the art today. The Kapton substrate 103 is bonded over the drive wires 102 on the substrate 100 preferrably by an adhesive means so that the Kapton material insulates the drive wires 102 from the sense wires 104 while at the same time holding the sense wires in close coupling relationship with the drive wires. An insulative covering 105 such as Mylar is bonded directly over the sense wires 104 to mechanically protect the wires from damage or shorting to the conductive patches. The complete assembly of substrate 100, conductive shield 101, drive wires 102, Kapton insulating substrate 103, the sense wires 104 and Mylar covering 105 together define the memory board. The information board consists of a substrate 106 containing a plurality of electrically conductive non-magnetic patches 107 which is more fully illustrated in FIG. 11. The actual information is contained in the location and placement of the conductive patches 107 in those areas where the drive wires cross the sense wires.

Referring now to FIG. 10, there is shown a stacked array of memory boards each having 32 drive positions and 32 sense positions. In the preferred embodiment, the individual memory boards are held in a spaced apart relationship by alignment devices, not illustrated, so that an individual memory board of the type shown in FIG. 11 may be interspersed inthe stacked array of memory boards. The complete read only memory system will therefore consist of a memory board and an associated information board of the type illustrated in FIG. 11. Since the preferred embodiment utilizes 16 memory boards in a stacked array, there will of course be required 16 information boards, one for each of the memory boards to thereby complete the memory system. The information boards are movable and replaceable at the will of the operator and of course the individual conductive patches 107 may be changed depending upon the needs of the memory and of the overall system. It is of course necessary that the information board and the individual memory board be properly aligned in order that the conductive patches 107 be precisely located over the area where the drive lines cross the sense lines. This of course is necessary to provide maximum coupling in the areas where a conductive patch is located.

It can be appreciated therefore that the present invention provides a semipermanent memory having access speeds that are greater than those presently available in the art of today. Further advantages and modifications will be apparent to those skilled in the art without departing from the scope of the invention as defined by the appended claims.

What is claimed is:

1. A device adapted to provide a first polarity signal of substantial magnitude representing a first state and a second polarity signal of lesser magnitude representing a second state, comprising in combination:

a two dimensional matrix having a plurality of orthogonally arranged rows and columns, each of said rows and columns comprising a pair of spaced apart parallel conductors, having first and second ends, each of said pairs of conductors being electrically connected at a first end;

signal generating means connected to said second ends of each of said pairs of conductors comprising the rows, coupling means for normally transferring lesser magnitude quanta of energy for generating second state representing signals between every pair of row conductors and every pair of column conductors that cross each other, and signal detecting means connected to each of said pairs of conductors comprising the plurality of the said columns, whereby signals applied to a row conductor pair are normally detected by all of the crossing column conductor pairs as second state representing signals.

2. A combination according to claim 1 which includes a plurality of non-magnetic, conductive film elements, each covering a selected area where a pair of row conductors and a pair of column conductors cross, for causing the energy coupling between the crossed row and column conductors to generate first state representing signals, for applying first state representing signals to said signal detecting means.

3. The combination according to claim 1 wherein said coupling means include at least one pair of parallel conductors having a right angle jog in the area where a row conductor pair crosses a column conductor pair, said jog being in a direction that increases the distance between said conductor pair and decreases the distance between said conductor pair in areas between conductor pairs, whereby second state representing signals are inductively coupled between said conductors over the portions of the path where the row conductors and column conductors are parallel.

4. A combination according to claim 3 in which said jog is located in the parallel pair of row conductors in the area where said pair of column conductors cross said pair of said row conductors, said jog being in a direction that increases the distance between said pair of row conductors.

5. A combination according to claim 4 in which said parallel pair of column conductors are located substantially over and parallel to the right angle jog in the pair of row conductors, for improving the inductive coupling between said row and column conductors.

6. A combination according to claim 1 wherein said coupling means include at least one conductive film, located between one of said pairs of conductors and external of the other of said pairs of conductors in the area of intersection, for applying to said signal detecting means second state representing signals through eddy current coupling.

7. A combination according to claim 1 in which each pair of column conductors are electrically connected at a second end to form a separate continuous loop for each column.

8. A combination according to claim 7 wherein said signal detecting means include a transformer coupling to each of said continuous column loops.

9. In combination:

a two dimensional matrix having a plurality of rows and columns, each of said rows and columns comprising a pair of spaced apart parallel conductors, each of said pairs of conductors being electrically connected at a first end, said pairs of column conductors being electrically connected at a second end to form a separate continuous loop for each column;

signal generating means connected to the second ends of each of said pairs of row conductors;

coupling means for transferring fixed amounts of energy of relatively low magnitude, representing a first value between every pair of row conductors and every pair of column conductors that cross each other; and signal detecting means coupled to each of said continuous column loops.

10. A combination according to claim 9 in which said signal detecting means are transformer coupled to each of said continuous column loops.

11. In combination:

a two dimensional matrix having a plurality of rows and columns, each of said rows and columns comprising a pair of spaced apart parallel conductors, each of said pairs of conductors being electrically connected at a first end, said pairs of column conductors being electrically connected at a second end to form a separate continuous loop for each column;

signal generating means connected to the second ends of each of said pairs of row conductors;

coupling means for transferring limited amounts of energy betwen every pair of row conductors and every pair of column conductors that cross each other; and signal detecting means coupled to each of said continuous column loops, including a single aperture ferrite bead for each column loop, one conductor of each of said column loops passing through the aperture of the single bead associated therewith, thereby forming a single turn primary winding.

12. A combination according to claim 11 in which said signal detecting means include a single turn secondary wire for each column loop, each of said secondary wires passing through the aperture of the single bead to form a secondary loop adapted to drive a differential amplifier.

13. A read only memory comprising, a first board having a substantially fixed substrate having a plurality of drive lines formed on one side of the substrate, each of said drive lines having a plurality of right angle jogs, each jog corresponding to a memory cell location of greater separation than in areas not corresponding to a memory cell location;

a plurality of sense lines located on flexible insulative substrate, said flexible insulative substrate attached to said fixed substrate over the drive lines so that sense lines are orthogonal to and insulated from the drive lines, and overlying and parallel to each of said jogs, for each of the memory cell locations;

an insulative covering bonded directly over the sense lines; and a second board comprising a movable substrate having a plurality of individual, selectively removable replaceable conductive films, each located at an area where said drive lines and said sense lines cross for defining a memory cell location;

said second board being positioned over said first board so that said conductive films are held in close contact and alignment overlying the memory cell locations where the sense lines cross the drive lines, whereby signals applied to said drive lines produce first polarity signals of relatively large magnitude to said sense lines in the presence of a conductive film and second polarity signals of relatively small magnitude in the absence of a conductive film.

14. A combination according to claim 9 which includes separate signal detecting means for each continuous column loop.

15. In combination, a plurality of read only memory boards each comprising:

a two dimensional matrix having a plurality of rows and columns, each of said rows and columns comprising a pair of spaced apart parallel conductors, each of said pairs of conductors being electrically connected at a first end, said pair of column conductors being electrically connected at a second end to form a separate continuous loop for each column;

signal generating means connected to the second end of each of said pairs of row conductors;

a single detecting means for each column loop coupled to corresponding loops in all of said boards, including a single aperture ferrite bead for each column loop in each board, one conductor of each column loop passing through the aperture of a single bead thereby forming a single turn primary winding, each of said detecting means being coupled to corresponding loops in all of said boards.

16. A combination according to claim 15 in which each of said detecting means comprises a single secondary wire passing through the aperture of said beads in corresonding board positions thereby forming a secondary loop.

17. A combination according to claim 16 in which the bead position for corresponding column loop positions in alternate ones of said boards is offset, so that the secondary wire loop passes through one-half of the beads in a first direction and one-half of the beads in an opposite direction, whereby induced noise signals are effectively cancelled.

18. A combination according to claim 15 which includes a differential amplifier connected to said single detecting means.

19. A combination according to claim 17 in which the secondary wire loop is connected to a differential amplifier.

* * * * *

UNITED STATES PATENT OFFICE

CERTIFICATE OF CORRECTION

Patent No. 3,787,821 Dated January 22, 1974

Inventor(s) BILLY H. VINSON

It is certified that error appears in the above-identified patent and that said Letters Patent are hereby corrected as shown below:

In the Abstract, 2d paragraph, l. 4, change "path" to --patch--.

Col. 1, line 19, change "Softward" to --Software--.

Col. 4, line 14, change "cloce" to --close--.

Col. 6, line 23, after "drive" change "line" to --lines--.

Col. 8, line 12, change "couplingis" to --coupling is--.

Col. 10, line 53, change "inthe" to --in the--.

Col. 12, line 50, (Claim 11) change "betwen" to --between--.

Signed and sealed this 23rd day of April 1974.

(SEAL)
Attest:

EDWARD M.FLETCHER,JR.
Attesting Officer

C. MARSHALL DANN
Commissioner of Patents

ORM PO-1050 (10-69)

USCOMM-DC 60376-P69
U.S. GOVERNMENT PRINTING OFFICE 1969 O—366-334